Oct. 7, 1969    E. E. SCHNELL ET AL    3,470,994
COVER ASSEMBLY FOR A CLEAN-OUT OPENING IN A FERTILIZER HOPPER
Filed Dec. 21, 1967

INVENTORS
ERNST E. SCHNELL
DONALD LEO CAROLAN
BY
ATTORNEY

United States Patent Office 3,470,994
Patented Oct. 7, 1969

3,470,994
COVER ASSEMBLY FOR A CLEAN-OUT OPENING IN A FERTILIZER HOPPER
Ernst Emil Schnell, West Bend, and Donald Leo Carolan, Beaver Dam, Wis., assignors to Deere & Company, Moline, Ill., a corporation of Delaware
Filed Dec. 21, 1967, Ser. No. 692,596
Int. Cl. B65g 69/00
U.S. Cl. 198—1   2 Claims

ABSTRACT OF THE DISCLOSURE

A cover assembly for a clean-out opening in the curved bottom portion of a transversely extending fertilizer hopper. An over-center toggle link mechanism is provided to hold a cover tightly over the opening.

Field of the invention

This invention relates generally to agricultural machinery, and more particular to fertilizer distributors of the type having a discharge opening to the front of the fertilizer hopper.

Description of the prior art

Most fertilizers in common usage today are quite corrosive to metals. This is particularly true when the humidity is high as most of the fertilizers are hygroscopic and react with water to form extremely corrosive compounds. Thus, it is common practice to clean out the fertilizer used in the fertilizer hopper of a grain drill and the like rather than let the fertilizer stay in the hopper for any length of time.

Some fertilizer hoppers in use today discharge the fertilizer material through an opening in the bottom of the hopper. The size of the opening is varied by a slidable gate having openings which correspond to the openings in the hopper. To clean out the hoppers with a bottom discharging opening, it is only necessary to move the slidable gate to full open position and flush the fertilizer material through this opening to clean out the hopper. Examples of this form of hopper are illustrated in the Seltzer U.S. Patent No. 2,704,624 and the Loomans U.S. Patent No. 2,894,663.

Summary of the invention

A newly developed fertilizer distributor discharges the fertilizer through an opening in the side of the hopper. With this form of fertilizer distributor (shown in the Quick et al. U.S. Patent No. 3,252,629), it is necessary to provide a bottom opening through which the fertilizer material may be cleaned out. During normal operation of the fertilizer distributor, it is necessary to provide a cover for the opening. It is desirable that the cover be of low cost, high durability, easy to assemble and disassemble, and having no loose parts which can become lost when either assembling to the hopper to cover the clean-out opening, or when disassembled during the cleaning out operation.

It is an object of this invention to provide a cover for a clean-out opening in the bottom of a transversely extending hopper, the cover being of high durability, low cost, and easily assembled and disassembled.

It is a further object of the present invention to provide a cover which can rapidly be secured to a fertilizer hopper having a clean-out opening in its bottom, the cover being held tightly over the opening during normal operation of the fertilizer distributor.

These and other objects and advantages of this invention will be apparent to those skilled in the art after a consideration of the following detailed description, taken in conjunction with the accompanying drawings in which the preferred form of this invention is illustrated.

Description of the preferred embodiment

Figure 1:
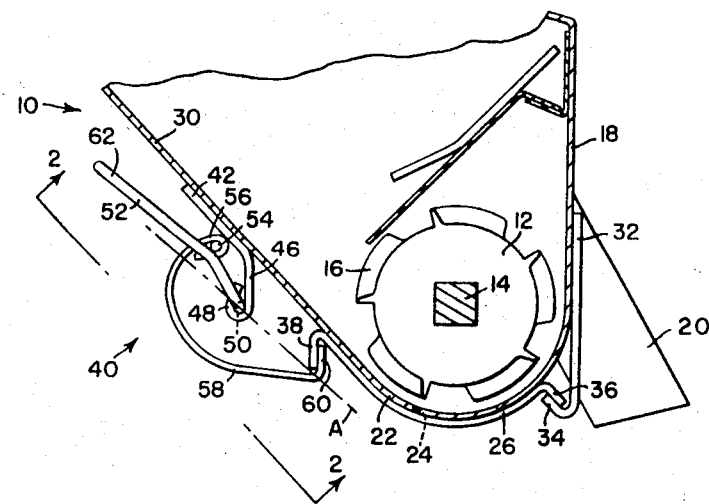
FIG. 1 is a sectional view through a fertilizer hopper showing the cover for the clean-out opening assembled in its desired position.
Figure 2:
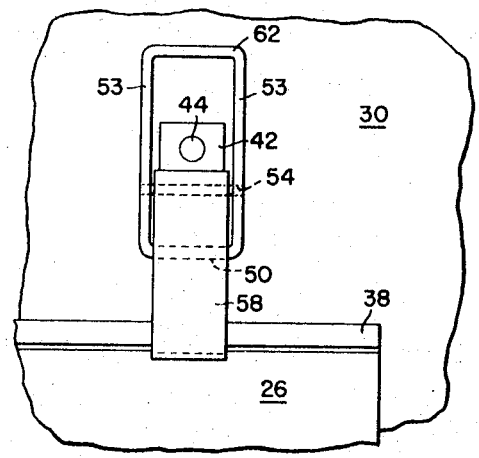
FIG. 2 is a view taken along the line 2—2 in FIG. 1 showing the upper latching mechanism of this invention.

The clean-out cover assembly of this invention is adapted to be associated with a fertilizer hopper of the type shown in the Quick et al. Patent No. 3,252,629. This form of fertilizer hopper, indicated generally at 10, has a rotor or feed means 12 mounted on a drive shaft 14 which is adapted to be rotated at varying speeds. The rotor or feed wheel 12 is provided with a plurality of lugs 16 on its outer surface. As the wheel is rotated, the lugs engage the fertilizer material and cause it to be discharged through an opening in the hopper's front wall 18 into a fertilizer tube 20, the opening being to the front of the fertilizer hopper.

The hopper has a curved transversely extending bottom portion 22 which is provided with openings 24 through which fertilizer material may be discharged for the purposes of cleaning out the hopper. The opening is normally covered by a cover 26, which is adapted to conform to the portion 22 of the hopper. The hopper is also provided with a rear inclined wall 30.

Secured to the forward wall 18 of the hopper is a plurality of transversely spaced apart latching members 32, each of the latching members having a lower lip 34 which projects towards the hopper 10. The cover 26 has first and second edges or lips bent at an angle reverse to that of the curvature of the bottom portion of the hopper, one of the reverse angled lips 36 being adapted to engage the lip 34 to hold the forward edge of the cover 26 into tight engagement with the bottom of the hopper when the other lip 38 is engaged by a second latching member, indicated generally at 40, and held adjacent the inclined wall 30.

While only one latching member 40 is illustrated in the drawing, it should be noted that there are a plurality of latching members which extend transversely across the rear wall 30 to hold the cover 26 securely in place. Each latching member 40 is formed from essentially three members that form an over-center toggle linkage. One of the members 42 is rigidly secured to the rear wall 30 by any suitable means 44 and has a portion 46 that is bent away from the wall and has a hinge formed portion 48 which receives a transversely extending pivot 50. A second member 52 formed of wire has a pivot portion 50, the pivot 50 being a transversely extending bight portion disposed between parallel leg portions 53. A second pivot 54, also formed of wire, is welded to one side of the legs 53 and is adapted to be engaged by a second hinge forming structure 56 of a third member 58.

The third member is made of resilient sheet metal stock and is shaped into a bow form and has one end 60 which is angled inwardly and adapted to engage the reversely angled lip 38. The other end of the bow-shaped member 58 is formed into the hinged portion 56.

FIG. 1 shows the cover assembly with the cover 26 covering the opening 24. To remove the cover assembly, it is only necessary to swing the handle portion 62 of the member 52 downwardly which will cause the pivot 54 to move towards the bottom of the hopper thus relieving the tension in the member 58 and permitting it to be swung away from the reverse edge or lip 38. Once the member 58 has been swung away from the lip 38, it is only necessary to rotate the other reverse lip 36 out from underneath the hook portion 34 to completely remove the cover.

To reassemble the cover, the lip 36 is hooked over the portion 34, the cover swung into position and the rear lip 38 engaged by the hook 60. At this time, the handle 62 is swung upwardly until the parts assume their over-center linkage position wherein the pivot 54 is above the line A which passes through the pivot 50 and the lower edge of the lip 38. When the parts are in this position, the resilient bow-shaped member 58 will hold the pivot above the center line thus maintaining the parts in their assembled position.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. A cover assembly for a clean-out opening in the curved bottom portion of a transversely extending hopper comprising: a cover having front and rear edge portions and an intermediate transversely extending curved portion adapted to conform to the curved bottom portion of the fertilizer hopper and cover the openings therein, the front and rear edge portions depending from and being disposed at a reverse angle to the intermediate portion, a first latch means fixedly secured to one side of the hopper and having a lower upwardly projecting lip over which one edge portion of said cover may be hooked, and a second latch means securable to the other side of the hopper, said second latch means including a lever member swingably interconnected with said hopper to swing fore-and-aft about a transverse horizontal axis, a vertically disposed second member having a lip at its lower end which projects towards said hopper and which may be disposed under and behind the other edge portion of said cover, and pivot means swingably interconnecting the other end of said second member with the lever member about an axis parallel to and radially offset from the transverse horizontal axis.

2. The cover assembly set forth in claim 1 in which said second member is a bow-shaped resilient member adapted to yield to permit said pivot means to move over center in respect to the transverse horizontal axis and the lower lip of the second member when the lip is under and behind the other edge portion of said cover.

References Cited

UNITED STATES PATENTS

| 1,761,842 | 6/1930 | Pierson | 198—207 |
| 2,624,492 | 1/1953 | Seltzer | 222—486 |
| 3,252,629 | 5/1966 | Quick | 222—177 |

RICHARD E. AEGERTER, Primary Examiner

U.S. Cl. X.R.

198—205; 222—177